US 8,469,275 B2

(12) United States Patent
Dahari

(10) Patent No.: US 8,469,275 B2
(45) Date of Patent: Jun. 25, 2013

(54) MULTIPLE BARCODE DETECTION SYSTEM AND METHOD

(75) Inventor: Ronen Dahari, Be'er Yaacov (IL)

(73) Assignee: Metaform Ltd., Hod Hasharon (IL)

( * ) Notice: Subject to any disclaimer, the term of this patent is extended or adjusted under 35 U.S.C. 154(b) by 0 days.

(21) Appl. No.: 13/265,164

(22) PCT Filed: Apr. 19, 2010

(86) PCT No.: PCT/IL2010/000310
§ 371 (c)(1),
(2), (4) Date: Oct. 19, 2011

(87) PCT Pub. No.: WO2010/122549
PCT Pub. Date: Oct. 28, 2010

(65) Prior Publication Data
US 2012/0048937 A1    Mar. 1, 2012

Related U.S. Application Data
(60) Provisional application No. 61/170,722, filed on Apr. 20, 2009.

(51) Int. Cl.
*G06K 5/04* (2006.01)
*G06K 7/10* (2006.01)

(52) U.S. Cl.
USPC ............ 235/462.08; 235/462.01; 235/462.09; 235/462.14; 235/462.45; 235/462.48; 235/472.01

(58) Field of Classification Search
USPC .............. 235/462.01, 462.08–462.11, 462.2, 235/375, 462.09, 462.1, 462.14, 462.45–462.49, 235/472.01–472.03
See application file for complete search history.

(56) References Cited

U.S. PATENT DOCUMENTS

| | | | |
|---|---|---|---|
| 5,811,779 A * | 9/1998 | Gaylord et al. | 235/462.01 |
| 6,801,245 B2 | 10/2004 | Shniberg et al. | |
| 6,922,208 B2 | 7/2005 | Shniberg et al. | |
| 7,325,737 B2 * | 2/2008 | Epshteyn et al. | 235/462.08 |
| 7,474,333 B2 | 1/2009 | Shniberg et al. | |
| 2005/0103846 A1 | 5/2005 | Zhu et al. | |
| 2005/0140498 A1 * | 6/2005 | Bastian | 340/5.92 |
| 2007/0119939 A1 | 5/2007 | Epshteyn et al. | |
| 2007/0274561 A1 | 11/2007 | Rhoads et al. | |
| 2008/0011856 A1 | 1/2008 | Bremer et al. | |
| 2008/0093459 A1 | 4/2008 | Lapstun et al. | |

* cited by examiner

*Primary Examiner* — Tuyen K Vo
(74) *Attorney, Agent, or Firm* — Nath, Goldberg & Meyer; Jerald L. Meyer

(57) ABSTRACT

Barcode detection method and systems are typically configured for reading each barcode individually. However, it is often advantageous to read a plurality of barcodes (or a batch of barcodes) in a single scanning operation. Provided is a barcode detection method and system which is capable of scanning an area including one or more barcodes, detecting and decoding the barcodes in the scanned area and generating a batch of barcodes all in a single scanning operation.

15 Claims, 9 Drawing Sheets

MULTIPLE BARCODE DETECTION SYSTEM AND METHOD

This is a National Phase Application filed under 35 U.S.C. §371 as a national stage of PCT/IL2010/000310, filed on Apr. 19, 2010, an application claiming the benefit under 35 U.S.C. §119(e) of U.S. Provisional Application No. 61/170,722, filed on Apr. 20, 2009, the content of each of which is hereby incorporated by reference in its entirety.

FIELD OF THE INVENTION

This invention relates to barcode detection systems and methods.

BACKGROUND OF THE INVENTION

Barcode detection systems are used to scan, detect and decode barcodes, which are typically attached to assets and represent data in respect to the assets.

Prior art references considered to be relevant as a background to the invention are listed below. Acknowledgement of the references herein is not to be inferred as meaning that these are in any way relevant to the patentability of the invention disclosed herein.

U.S. Pat. No. 6,801,245: A system and methodology for tracking objects including affixing at least one imagable identifier onto each of a multiplicity of objects to be tracked, imaging at least a portion of at least one of the multiplicity of objects at a known location to provide an at least partial image of the at least one of the multiplicity of objects, containing the at least one imagable identifier and employing the at least partial image of the object containing the at least one imagable identifier to provide an output indication of the location of the at least one of the multiplicity of objects.

U.S. Pat. No. 6,922,208 A methodology for tracking objects includes receiving a multiplicity of objects to be tracked at a known location. Each multiplicity of objects has at least one imagable identifier affixed to it. The method also includes imaging the multiplicity of objects together at the known location to provide at least a partial image of the multiplicity of objects. The method also includes employing the partial image to determine an identification code for a plurality of the multiplicity of objects, as well as associating each identification code with a known location code.

U.S. Pat. No. 7,474,333 A methodology for tracking objects includes receiving a multiplicity of objects to be tracked at a known location. Each multiplicity of objects has at least one imagable identifier affixed to it. The method also includes imaging the multiplicity of objects together at the known location to provide at least a partial image of the multiplicity of objects. The method also includes employing the partial image to determine an identification code for a plurality of the multiplicity of objects, as well as associating each identification code with a known location code.

U.S. 2007119939: A system is provided for selecting a particular barcode on an item that includes multiple barcodes. The system (1) acquires, via a barcode imager, an image of the item within the field of view of the barcode imager, (2) analyzes the acquired image to determine a set of potential barcode fields, (3) determines, using a predetermined criterion (e.g., distance from center of imaged area, type of bar code, etc.), a candidate barcode field from among the set of potential barcode fields, (4) displays a modified image derived from the acquired image, wherein the candidate barcode field is identified within the modified image, and (5) allows the user to initiate a decode session when the candidate barcode field includes the desired barcode. The acquired may be modified to highlight the candidate barcode field in any number of ways, including, for example, superimposing an artificial reticule around the candidate field, superimposing an artificial scan line over the field, altering the contrast of the field, and/or altering the brightness of the field.

U.S. 2005103846: A hand-supportable Digital Imaging-Based Bar Code Symbol Reading Device comprises: an IR-based Object Presence and Range Detection Subsystem; a Multi-Mode Area-type Image Formation and Detection Subsystem having narrow-area and wide area image capture modes of operation; a Multi-Mode LED-based Illumination Subsystem having narrow-area and wide area illumination modes of operation; an Automatic Light Exposure Measurement and Illumination Control Subsystem; an Image Capturing and Buffering Subsystem; a Multi-Mode Image-Processing Bar Code Symbol Reading Subsystem; an Input/Output Subsystem; a manually-activatible trigger switch; a System Mode Configuration Parameter Table; and a System Control Subsystem integrated with each of the above-described subsystems. The bar code reading device can be configured and operated in numerous programmable modes of system operation to automatically read 1D and 2D bar code symbologies in a high-speed manner using advanced modes of image processing on captured images. There is a need in the art for a new barcode detection system for reading batches of barcodes in a single scanning operation.

SUMMARY OF THE INVENTION

According to first aspect of the invention there is provided a barcode detection system for simultaneously detecting a group of barcodes, comprising a handheld barcode reader comprising an imaging device and a processing unit; the barcode reader being responsive to an activation device; the activation device is configured to generate an activation signal in response to a first action of a user; the barcode reader is configured to commence a scanning operation in response to the activation signal; the imaging device is configured to scan a plurality of barcodes during the scanning operation; the processing unit is configured to perform at least generating one or more images representing the plurality of barcodes; detecting and decoding the plurality of barcodes within the one or more images thereby obtaining data in respect of each barcodes from the plurality of barcodes; and comparing between the plurality of barcodes based on the data in respect of each of the plurality of barcodes and removing repeating instances of the same barcodes from the plurality of barcodes, thereby identifying one or more non-repeating barcodes; the activation device is configured to generate a termination signal in response to a second action of the user, and wherein in response to the termination signal the barcode reader is configured to terminate the scanning operation and generate a group of non-repeating decoded barcodes.

According to a second aspect of the present invention there is provided a barcode detection method for simultaneously detecting a group of barcodes, comprising initiating a scanning operation in response to an activation signal generated by an activation device in response to a first action of a user; scanning a plurality of barcodes, by an imaging device, during the scanning operation; generating one or more images representing the plurality of barcodes; detecting and decoding the plurality of barcodes within the one or more images thereby obtaining data in respect of each barcodes from the plurality of barcodes; comparing between the plurality of barcodes based on the data in respect of each of the plurality of barcodes and removing repeating instances of the same barcodes from the plurality of barcodes, thereby identifying one or more non-repeating barcodes; terminating the scanning operations in response to a termination signal generated by the activation device in response to a second action of a user; and generating a group of non-repeating decoded barcodes.

According to a third aspect of the present invention there is provided a barcode detection method for simultaneously detecting a group of barcodes, comprising:
- (a) initiating a scanning operation in response to an activation signal generated by an activation device in response to a first action of a user;
- (b) scanning a plurality of barcodes, by an imaging device, during the scanning operation;
- (c) generating one or more images, representing the plurality of barcodes;
- (d) detecting and decoding the plurality of barcodes within the one or more images thereby obtaining data in respect of each barcode from the plurality of barcodes; the data including at least, decoded information from each barcode and location of each barcode in respect of a scanned area in the scanning operation; where stage (d) further comprises:
  - i) identifying a first barcode from a first image of the one or more images and a second barcode from a second image of the one or more images, the first barcode and second barcode having identical decoded information;
  - ii) comparing between a location of the first barcode in respect to the scanned area and a location of the second barcode in respect of the scanned area and calculating a distance between the first and the second barcode;
  - iii) determining whether the distance is greater than a predetermined maximal distance and if so, designating the first barcode and the second barcode as non-repeating barcodes and saving data in respect of both the first and the second barcode;
  - iv) otherwise designating the first and the second barcode as repeating barcodes and discarding one of the first and the second barcodes and saving data in respect of the other;
  - v) Repeating stages (i) to (iv) for each barcode from the plurality of barcodes;
- (e) terminating the scanning operations in response to a termination signal generated by the activation device in response to a second action of a user; and,
- (f) generating a group of non-repeating decoded barcodes.

According to a fourth aspect of the present invention there is provided a barcode detection system, comprising:
- a handheld barcode reader comprising an imaging device and a processing unit;
- the barcode reader being responsive to an activation device;
- the activation device is configured to generate an activation signal in response to a first action of a user;
- the barcode reader is configured to commence a scanning operation in response to the activation signal;
- the imaging device is configured to scan at least one or more barcode and additional data, during the scanning operation;
- the processing unit is configured to perform at least the following:
- generating one or more images representing the one or more of barcodes and the additional data;
- detecting and decoding one or more barcodes one or more of barcodes within the one or more images thereby obtaining data in respect of each barcode from the one or more of barcodes;
- detecting additional data in an area surrounding the one or more barcodes;
- associating the additional data to a corresponding barcode; and
- storing the additional information in association with a corresponding barcodes.

According to a fifth aspect of the present invention there is provided a barcode detection method, comprising:
- (a) initiating a scanning operation in response to an activation signal generated by an activation device in response to a first action of a user;
- (b) scanning one or more barcodes and additional data, by an imaging device, during the scanning operation;
- (c) generating one or more images representing the one or more of barcodes and additional data;
- (d) with the help of a processing unit, detecting and decoding the one or more of barcodes within the one or more images thereby obtaining data in respect of each barcode from the one or more barcodes, and detecting additional data in an area surrounding the one or more barcodes;
- (e) associating the additional data to a corresponding barcode; and
- (f) storing the additional information in association with the corresponding barcode.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EMBODIMENTS OF THE INVENTION

Unless specifically stated otherwise, as apparent from the following discussions, it is appreciated that throughout the specification discussions utilizing terms such as "processing", "computing", "calculating", "determining", "generating", "recognizing", "setting", "configuring" or the like, refer to the action and/or processes of a computer that manipulate and/or transform data into other data, said data represented as physical, e.g. such as electronic, quantities and representing the physical objects. The term "computer" should be expansively construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices and combinations thereof.

The operations in accordance with the teachings herein may be performed by a computer specially constructed for the desired purposes or by a general purpose computer specially configured for the desired purpose by a computer program stored in a computer readable storage medium.

In addition, embodiments of the present invention are not described with reference to any particular programming language. It will be appreciated that a variety of programming languages may be used to implement the teachings of the inventions as described herein.

As used herein, the phrase "for example," "such as" and variants thereof describing exemplary implementations of the present invention are exemplary in nature and not limiting. Reference in the specification to "one embodiment", "an embodiment", "some embodiments", "another embodiment", "other embodiments", "certain embodiment" or variations thereof means that a particular feature, structure or characteristic described in connection with the embodiment(s) is included in at least one embodiment of the invention. Thus the appearance of the phrase "one embodiment", "an embodiment", "some embodiments", "another embodiment", "other embodiments", "certain embodiments" or variations thereof do not necessarily refer to the same embodiment(s).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. While the invention has been shown and described with respect to particular embodiments, it is not thus limited. Numerous modifications, changes and improvements within the scope of the invention will now occur to the reader.

Figure 3:
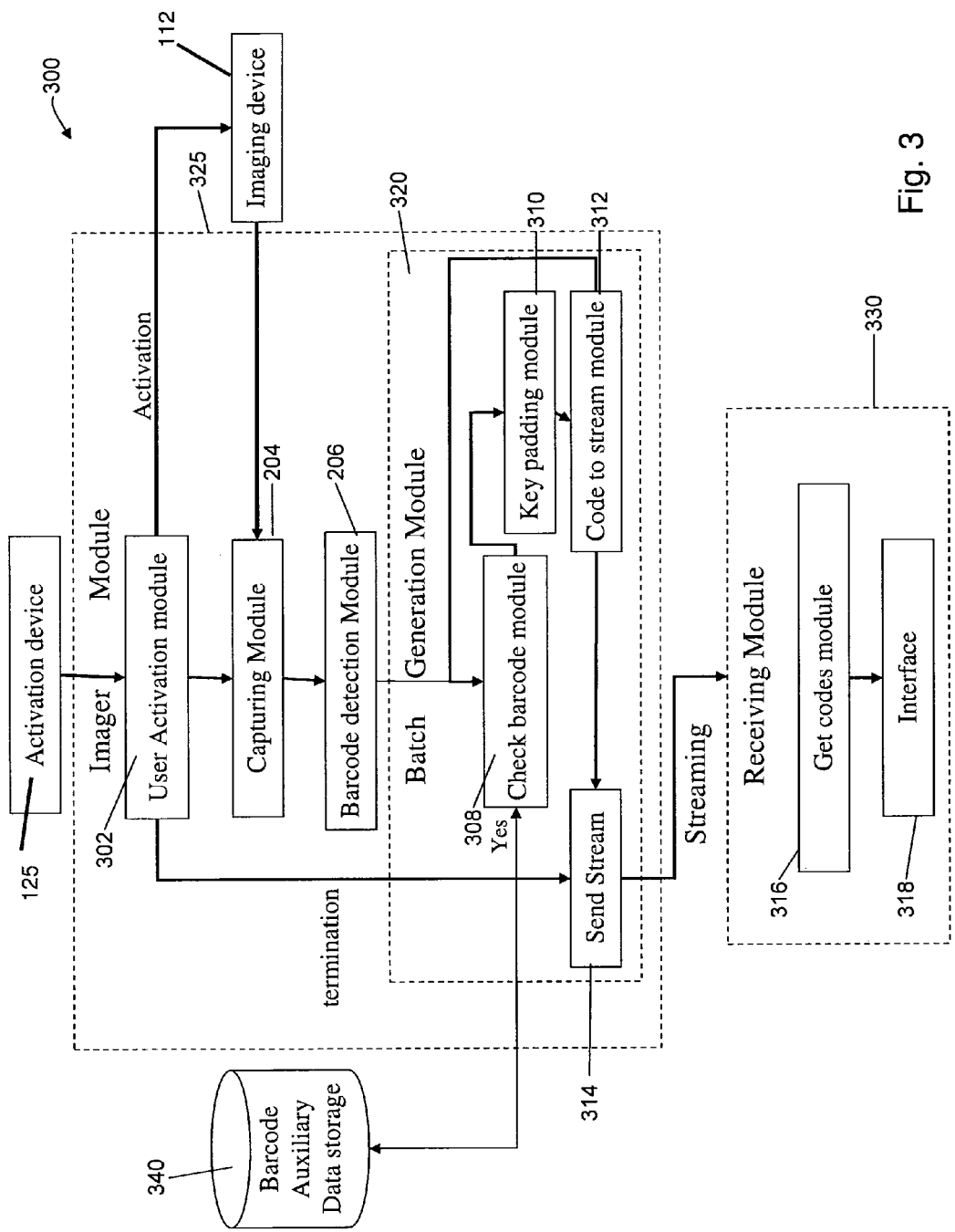
FIG. 3 is a schematic illustration of a first embodiment of a barcode detection system, in accordance with an embodiment of the invention.
Figure 4:
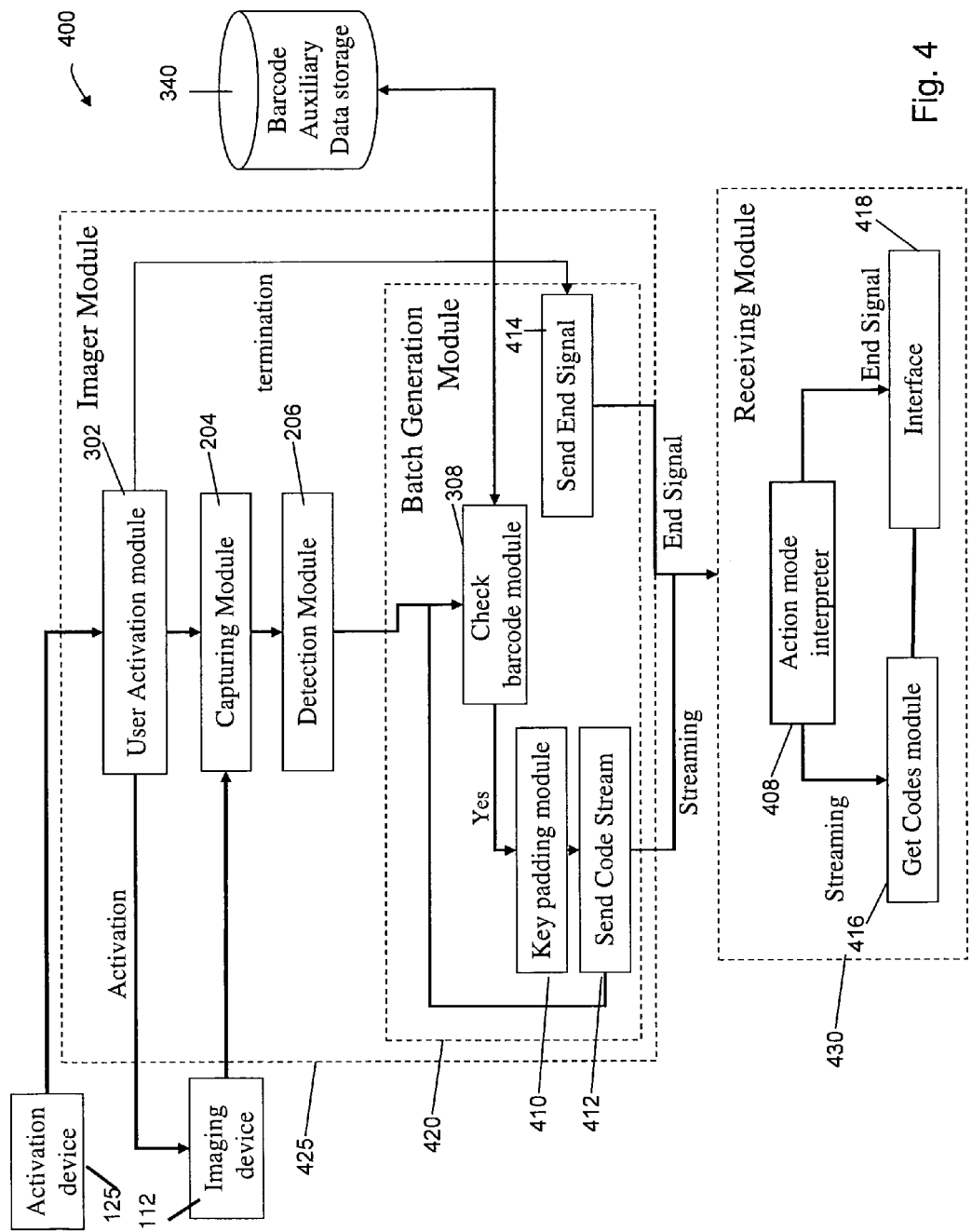
FIG. 4 is a schematic illustration of a second embodiment of a barcode detection system according to an embodiment of the invention.
Figure 7:
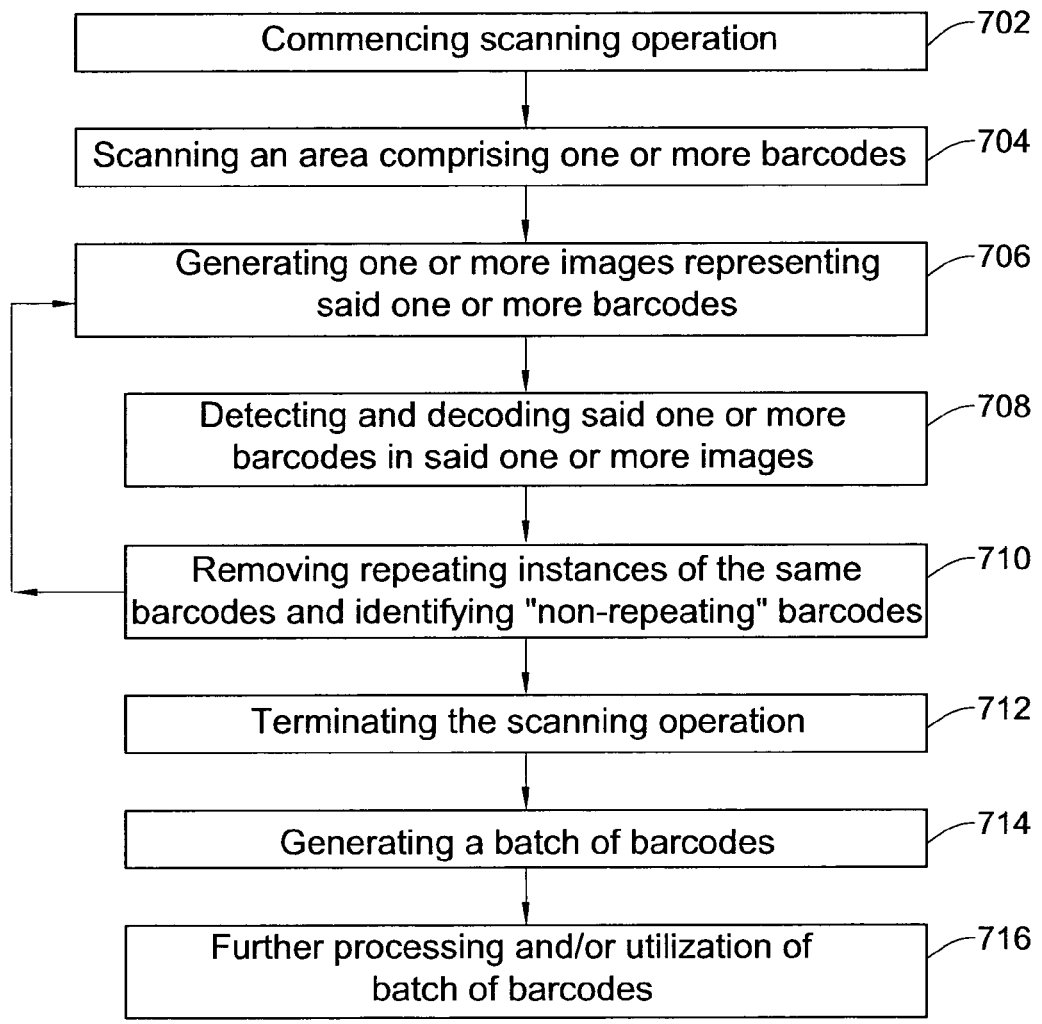
FIG. 7 is a flowchart illustrating general operations carried out in accordance with an embodiment of the invention.

In embodiments of the invention, fewer, more and/or different stages than those shown in FIG. 7 may be executed. In embodiments of the invention one or more stages illustrated in FIG. 7 may be executed in a different order and/or one or more groups of stages may be executed simultaneously. FIG. 3 and FIG. 4 illustrate a general schematic of the system architecture in accordance with an embodiment of the invention. Each module in FIG. 3 and FIG. 4 can be made up of any combination of software, hardware and/or firmware that performs the functions as defined and explained herein. The modules in FIG. 3 and FIG. 4 may be centralized in one location or dispersed over more than one location. In other embodiments of the invention, the system may comprise fewer, more, and/or different modules than those shown in FIG. 3 and FIG. 4.

Unless defined otherwise, all technical and scientific terms used herein have the same meaning as commonly understood by one of ordinary skill in the art to which this invention belongs. Generally (although not necessarily), the nomenclature used herein described below are well known and commonly employed in the art. Unless described otherwise, conventional methods are used, such as those provided in the art and various general references.

Figure 1:
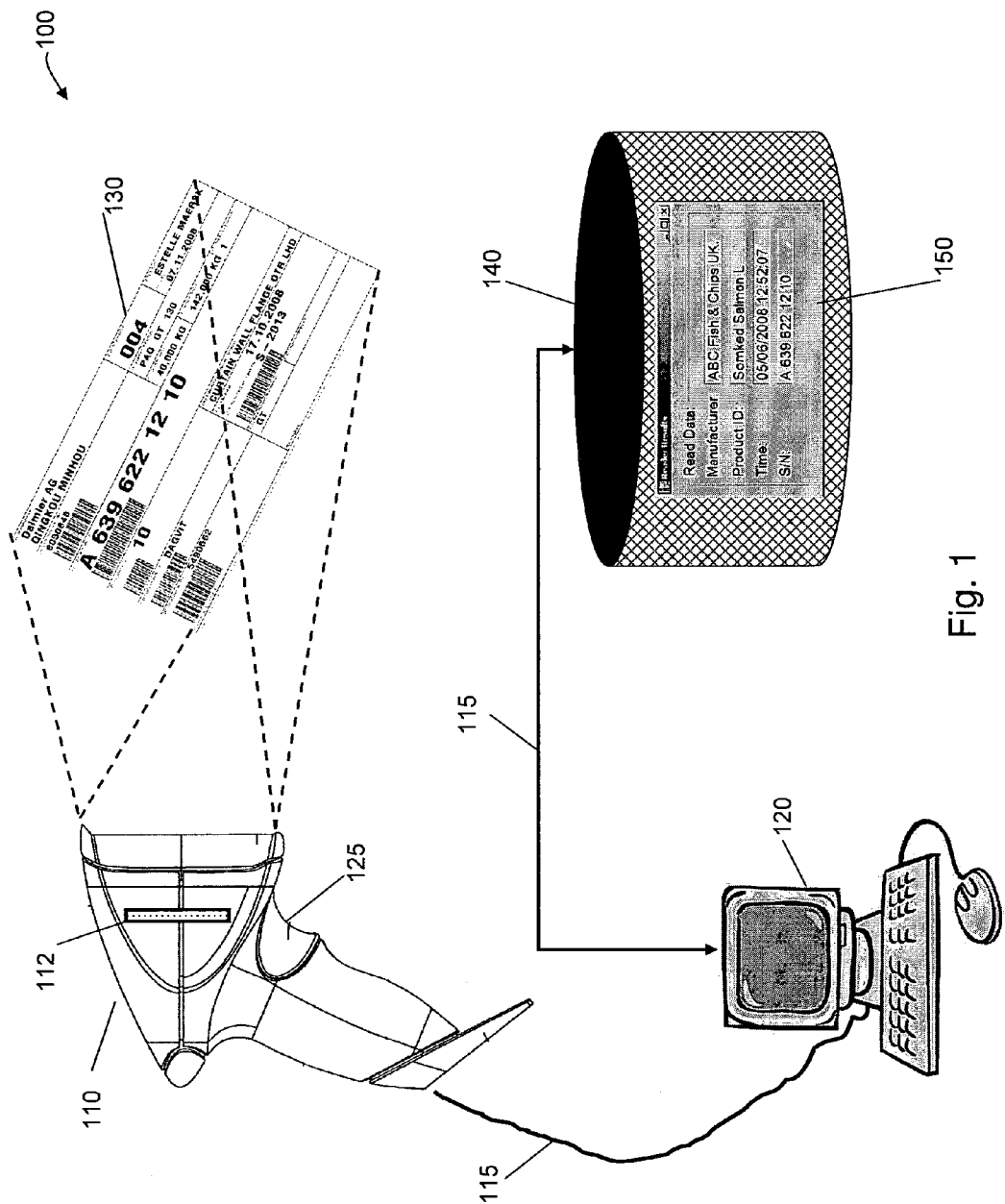
FIG. 1 is an illustration of a barcode detection system.

Bearing the above in mind attention is now drawn to FIG. 1 showing an illustration of a barcode detection system 100. Typically, barcode detection systems comprise an imager 110 (also known as a barcode reader or a scanner) associated, via a communication link 115, with a computer terminal 120. The imager comprises a scanning or imaging device 112 capable of reading a printed sign or indication, e.g. a barcode 130. Imaging device 112 may comprise of any suitable means such as a CMOS, CCD sensor, a laser scanner etc. Activation of the reader is typically controlled by any type of suitable activation means or device 125. In some embodiments the activation of the reader is controlled by a button or a trigger which is located on the imager. Alternatively, the activation may be controlled from the computer terminal 120 or by any other suitable activation means or device such as a remote activation device or a remote computer. FIG. 1 features an imager 110 designed for being operated by hand, however other barcode detection systems may utilize stationary barcode readers. It should be noted that although the present invention is described in connection with a portable barcode imager, this should be considered as an example only and the invention should not be construed as limited by this example.

When activated, the imager scans and generates one or more images (or frames) of one or more barcodes 130, residing within the field of view of the imager's imaging device 112. The generated images are processed by utilizing barcode detection and decoding hardware and software. The decoded information is often transferred to the computer terminal 120 for further processing. Normally each barcode or group of barcodes is associated with an asset and represents encoded information corresponding to that asset. A typical output of an imager would be a list of items corresponding to assets which are associated with the scanned barcodes. Each item in the list may contain the information encoded in the barcode and possibly the location of the barcode in the generated image.

In some embodiments, computer terminal 120 comprises a processor and a display, and may be, for example, a personal computer, a portable computer or a similar device with adequate processing capabilities. In some embodiments the imager 110 and computer terminal 120 may be connected via a communication link 115 while in other embodiments, imager 110 and computer terminal 120 may be combined into a single unit. Computer terminal 120 may be associated either directly or via a communication link 115 to a data storage unit 140, which may be utilized for storing the information decoded from the barcodes, for example in a relational database 150. Communication link 115 may be realized by any suitable connection or communication utility. The communication link 115 may be implemented by hardwire or wireless communication means.

Figure 2:
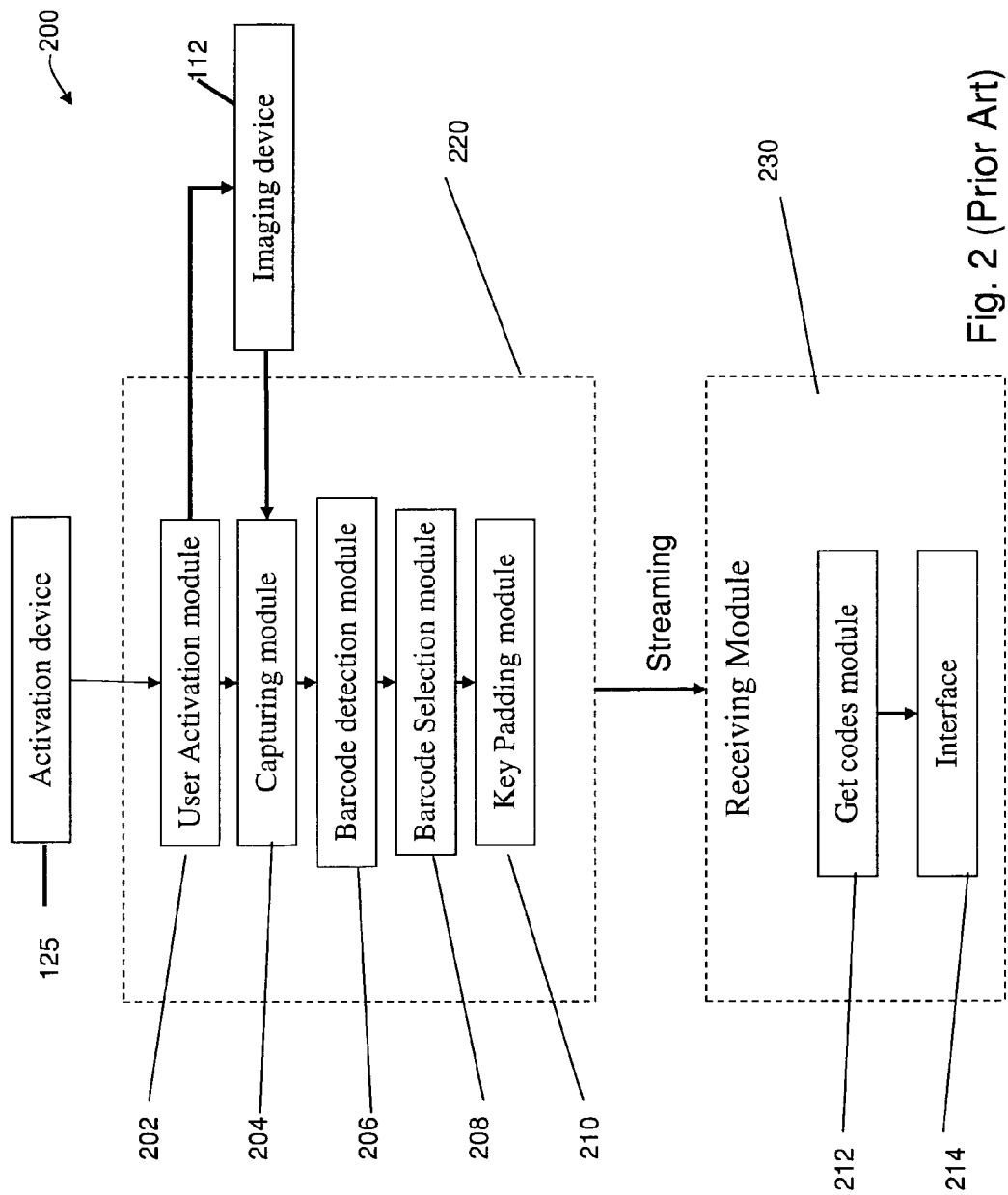
FIG. 2 is a schematic illustration of prior art barcode detection system.

FIG. 2 is a schematic illustration of a prior art barcode detection system 200. In general, system 200 can be divided into two main processing units: an imager module 220 which is associated with an imager 110 and a receiving module 230 which is associated with a computer terminal 120. Imager module 220 comprises a user activation module 202 being responsive to activation device 125 and configured for activating the imaging device 112. Imager module 220 further comprises a capturing module 204 which is associated with the imaging device 112. In operation the imager 110 is placed in front of one or more barcodes and activated. The capturing module 204 receives the scanned data from the imaging device 112 and generates one or more images of the scanned area. Each image (or frame) of the scanned area is transferred to a barcode detection module 206 which is configured for identifying the barcodes within the scanned image or images and for decoding the information encoded in the barcodes into strings of characters. In case the generated images comprise more than one barcode, a barcode selection module 208 is typically utilized. The barcode selection module 208 is configured for selecting a single barcode, from a plurality of barcodes which were identified by the barcode detection module 206. Different methods, which are known in the art, can be implemented for selecting a single barcode from a plurality of barcodes. For example, one such method is described in U.S. Pat. No. 7,325,737. Once a barcode has been selected, a key padding module 210 may be utilized for adding key padding at the end of the string. The string of characters representing the information encoded by the selected barcode is transferred to the computer terminal 120 preferably as streaming data. The information is received in the computer terminal 120 by a get code module 212, which is configured for receiving streaming data and extracting the data. Finally the information, which was decoded from the selected barcode, is available in the computer terminal 120 for further processing and utilization. For example information corresponding to a certain asset associated with the decoded barcode may be stored in a data storage unit 140 or displayed on a displaying device.

As expounded above, system 200 is configured for reading each barcode individually. However, it is often advantageous to read a plurality of barcodes (or a batch of barcodes) together. For example consider a group of barcodes which are situated in close proximity to each other, and which are being read by an imager having a field of view such that the imager would inevitably capture more than one barcode within each image. In order to detect all barcodes in a group of barcodes it would be necessary to repeatedly apply the imager to the same area containing the barcodes. However, as described above with reference to FIG. 2, the imager of system 200 is configured for detecting a single barcode out of a group of barcodes according to predefined rules. Therefore, since the same rules are executed each time the imager is activated, it is likely that applying the imager to the same area repeatedly would give rise to the same results, and thus the same specific barcode is likely to be selected again and again. Furthermore, even if technically different barcodes could be detected in repeated scanning, since a plurality of barcodes fall in the same field of view, the user would be unable to determine, which of the barcodes have been scanned and whether all barcodes, a subset of barcodes or only a single barcode have been identified.

Consider another scenario where a single asset is associated with a plurality of barcodes, each barcode encoding a different type of information. For example, a first barcode identifying the type of the asset, a second barcode identifying the weight of the asset and a third barcode identifying the shipping destination of the asset. It would be advantageous to be able to scan together all barcodes corresponding to a specific asset (i.e. a batch of barcodes). This would enable, for example, to simultaneously read a batch of barcodes associated with a specific asset, and to automatically store the batch of barcodes in a single record in a relational table. Even assuming that some prior art barcode detection systems are capable of discerning between individual barcodes in a group of barcodes and enable reading each separately (having for example an adequate field of view), when using these prior art systems, the user is still required to monitor the process and identify when all barcodes of a certain batch of barcodes, which are associated with a specific asset, have been read and to manually signal the computer system (e.g. by pressing a button). This type of manual operation and monitoring may cause mistakes and confusion.

Turning to FIG. 3, this shows a schematic illustration of a first embodiment of a barcode detection system, in accordance with an embodiment of the invention. According to certain embodiments, system 300 comprises two main processing units: the first is an imager module 325 which is associated with the imager 110 and the second is a receiving module 330 which is associated with a computer terminal 120. In other embodiments, both processing units may be configured as a single processing unit. According to certain embodiments, imager module 325 comprises a user activation module 302, a capturing module 204, a detection module 206 and a batch generation module 320. The user activation module 302 is responsive to a user activation device 125 and is configured for commencing a scanning operation of the imager in response to an activation signal from the user activation device 125 (e.g. a user pressing a trigger or a start button configured on the imager). According to certain embodiments, the user activation module 302 is also configured for terminating a scanning operation in response to a termination signal from the user activation device 125 (e.g. a user releasing a trigger or pressing an off button configured on the imager). In some embodiments, system 300 may comprise an activation device for activating the imager and a separate deactivation device for deactivating the imager. It should be noted that, as used herein, the phrase "scanning operation" refers to the scanning which is performed by the imager, starting in response to an activation signal from the activation device 125 and ending in response to the consecutive termination signal from the activation device 125. During the scanning operation one or more barcodes are scanned by the imaging device 112. According to certain embodiments of the invention, barcodes which are scanned in a single scanning operation are all associated with the same batch of barcodes. Thus, the user generated activation signal and user generated termination signal enable the user to easily define which barcodes should be included in a given batch of barcodes.

As explained above, with reference to FIG. 2, once the reader is placed before one or more barcodes and activated the imaging device scans the area within the field of view of the barcode and the capturing module 204 receives the scanned data from the imaging device and generates one or more images of the scanned area. According to certain embodiments, during each scanning operation system 300 is configured to continuously scan the area residing within the field of view of the imager while the capturing module 204 is configured for continuously generating images of the scanned area at a predetermined rate in accordance with the technical characteristics of the imaging device 112. Each image of the scanned area is transferred to a barcode detection module 206 which is configured for identifying all the barcodes in the image and for decoding the information encoded in the barcodes into one or more strings of characters representing the encoded information. According to certain embodiments, the decoded barcodes from each captured image are transferred to a batch generation module 320 for further processing.

According to certain embodiments, where a portable (i.e. handheld) imager is used the imager can be maneuvered by hand, in a continuous scanning motion over an area which is larger than the size of the field of view of the imager. Thereby the imager can detect in one scanning operation barcodes residing in an area which is larger than the field of view of the imager. For example, consider a palette of assets 2 meters high and 1 meter wide and an imager having a field of view of 0.5×0.5 meters. The user may be interested in including all assets in the palette in the same batch (e.g. in order to store all data which is relevant to the palette in a single record in a relational table). Accordingly, the user may continuously scan the entire barcodes on the surface of the palette in a single scanning operation.

As explained above, barcode detection system 300 is configured for simultaneously detecting a batch of barcodes and enables to perform a continuous scanning motion during a single scanning operation. This type of continuous scanning motion may often result in the generation of a plurality of images where different images contain overlapping sections of the same scanned areas. Therefore, the barcode detection system of the present invention is required to verify that in each scanning operation only a single instance of each barcode is recorded and transferred to the computer terminal 120.

According to one embodiment, batch generation module 320 comprises a check barcode module 308, a key padding module 310, a code to stream module 312 and a send stream module 314. In general batch generation module 320 is configured for receiving decoded barcodes from barcode detection system 206, removing repeating instances of the same barcodes, in different images generated during the same scanning operation, in order to avoid recording the same barcode more than once and sending the decoded barcodes to the computer terminal 120.

According to certain embodiments, for each captured image, check barcode module 308 receives from the detection module 206 data in respect of the decoded barcodes which were detected in that image. According to certain embodiments, the check barcode module 308 is configured for comparing each of the received barcodes from the current image with previously received barcodes (barcodes identified in previous images) and determining whether the received barcodes represent non-repeating barcodes or whether the received barcodes include repeating barcodes which have already been detected in previous images from the same scanning operation. According to certain embodiments, the comparison between barcodes from different images is based on the received data in respect of each image. The data may include for example, the decoded information from each barcode and the spatial location of the barcode within the image (e.g. coordinates of the barcode relative to the boundaries of the image such as pixel coordinates). In should be noted that as used herein the term "non-repeating barcode" refers to a unique instance of a barcode in a single scanning operation. According to certain embodiments non-repeating barcodes and their coordinates are stored in barcode auxiliary data storage 340 for future reference and comparison. Otherwise repeating instances of the same barcodes are discarded. A more detailed description of the operations performed by the check barcode module 308, in accordance with an embodiment of the invention, is described below with reference to FIG. 6.

Optionally, each non-repeating barcode is transferred to a key padding module 310 configured for adding padding at the end of the string representing the barcode.

According to certain embodiments, the padded strings of each barcodes are added to a data stream, by a code to stream module 312 which is configured for preparing the barcodes for sending as a stream of data. Eventually the stream of data comprises all non-repeating barcodes which have been scanned together in a single scanning operation (i.e. comprising a single batch). According to one embodiment, during its construction, the data stream is being temporally stored in a data storage facility associated with the code to stream module 312. According to certain embodiments, the operations which are performed by check barcode module 308, the key padding module 310 and the code to stream module 312 are repeated for each barcode in each of the images generated by capturing module 204 in a single scanning operation. Optionally, once the data stream contains all non-repeating barcodes of a certain batch of barcodes a batch padding key is added at the end of the stream of data, which identifies a batch of barcodes.

According to certain embodiments, in response to a termination signal the activation module 302 terminates the scanning operation and sends an "end signal" to a send stream module 314. In response to the "end signal" the send stream module 314, sends the data stream which contains the decoded barcodes of a batch of barcodes to the receiving module 330. According to certain embodiments, as a response to the termination signal the information in respect of the barcodes which is stored in the auxiliary data base 340 is deleted.

According to certain embodiments, the computer terminal 120 comprises a receiving module 330 which is configured for receiving the stream of information containing a batch of non-repeating barcodes. According to certain embodiments, the receiving module 330 utilizes the batch padding key in order to identify the specific batch of barcodes. According to certain embodiments, the receiving module comprises a get code module 316, which is further configured for extracting from the received stream of barcodes the individual barcodes, wherein each barcode is identified according to its padding. The batch of barcodes can then be utilized or further processed by the computer terminal 120. For example, where each batch of barcodes contains all the barcodes which correspond to one asset, the entire batch of barcodes can be transferred to a data storage unit 140, wherein each barcode in the batch of barcodes can be stored in a different field in a single record of a relational table. According to certain embodiments, an interface (or API) 318 enables to utilize, process, or send to a desired destination, the information from the scanned barcode.

FIG. 4 is a schematic illustration of a second embodiment of a barcode detection system according to an embodiment of the invention. Similar to system 300 which was described above system 400 may be divided into two main processing units: an imager module 425 and a receiving module 430. According to certain embodiments, imager module 425 comprises a user activation module 302, a capturing module 204 a detection module 206 and a batch generation module 420. As described above with reference to FIG. 3 the activation and termination of each scanning operation is controlled by a user activation module 302 which is responsive to a user activation device 125. Upon activation, imaging device begins to scan the area in the field of view and the capturing module 204 is configured to receive the scanned data from the imaging device and to continuously generate images of the scanned area. The images are transferred to a detection module 206 which is configured for detecting and decoding all the barcodes in each of the generated images. According to certain embodiments the batch generation module 420 receives from the detection module 206 the decoded barcodes and the coordinates (e.g. pixel coordinates) representing the spatial location of the barcodes in the corresponding image.

As mentioned above, in some embodiments, check barcode module 308 is configured for removing repeating instances of the same barcodes in different images, identifying non-repeating barcodes and storing the non-repeating barcodes and other data in respect of the non-repeating barcodes in a barcode auxiliary data storage 340 as explained in more detail below with reference to FIG. 6.

Unlike system 300 the batch generation module 420 of system 400 does not create a stream of data containing all barcodes scanned together in a single scanning operation, but rather sends, to the receiving module 430, the data corresponding to each non-repeating barcode separately. According to certain embodiments each non-repeating barcode which is identified by the check barcode module 308 is sent to a padding key module, which adds a padding key at the end of the string representing the information in the barcode. Next a send stream module 412 sends each non-repeating barcode to the receiving module 430, preferably by streaming.

According to certain embodiments, once the scanning operation is terminated a signal (e.g. "end signal") is sent from the user activation module, via an end signal module 414 to the receiving module 430. The end signal indicates that the scanning operation is over and that all (non-repeating) barcodes corresponding to a single batch have been detected and were sent to the receiving module. According to certain embodiments, in response to the termination signal the information in respect of the barcodes which is stored in the auxiliary data base 340 is deleted.

According to one embodiment, receiving module 430 comprises an action mode interpreter 408. The information which is sent from the imager module 425 is received by the action mode interpreter 408 which in turn determines whether the received information comprises streaming data containing information with regard to a non-repeating barcode or an end signal. According to certain embodiments, in case the information which is received is of a non-repeating barcode, a get code module 416 is utilized, which is configured for extracting the information from the stream and adding it to a list which contains the information corresponding to barcodes of the same batch. In case the action mode interpreter 408 identifies an end signal, the receiving module 430 identifies the existing list of barcodes as representing all barcodes in a batch and continues the processing of the barcodes on the list as described above with reference to FIG. 3. According to certain embodiments, an interface 418 enables the utilization of the non-repeating barcodes.

As explained above with reference to FIG. 3 and FIG. 4, in accordance with certain embodiments, check barcode module 308 receives from the barcode detection module 206 data corresponding to the detected barcodes and is configured for confirming whether each received barcode is a non-repeating barcode and for discarding repeating instances of the same barcodes. In general in a single scanning operation the imager may capture the same area or close areas several times, and generate a plurality of different images (or frames) having overlapping sections. Thus, repeating instances of the same barcodes in different images are likely to occur. Since the system and method of the present invention are directed for detecting multiple barcodes (i.e. batches of barcodes) in one scanning operation, and not a single barcode, it is necessary to identify repeating instances of barcodes, in different images, in order to avoid redundancy of barcodes in the final batch of detected barcodes.

According to one embodiment, where the entire collection of barcodes, which are scanned in a single scanning operation, is limited to unique barcodes only (i.e. each barcode appears only once) it is enough to compare each barcode, detected in one image, with other barcodes, detected in previous images. According to one embodiment, check barcode module 308 is configured to compare each decoded barcode from the currently processed image to other decoded barcodes from previously processed images, which are stored in the barcode auxiliary database 340. If the barcode exists in the auxiliary database 340 it is discarded, and check barcode module 308 turns to checking the next detected barcode. Otherwise it is designated as a non-repeating barcode, stored in the barcode auxiliary database 340 for future reference, and sent for further processing, for example to the key padding modules (410 or 310).

Figure 5A:
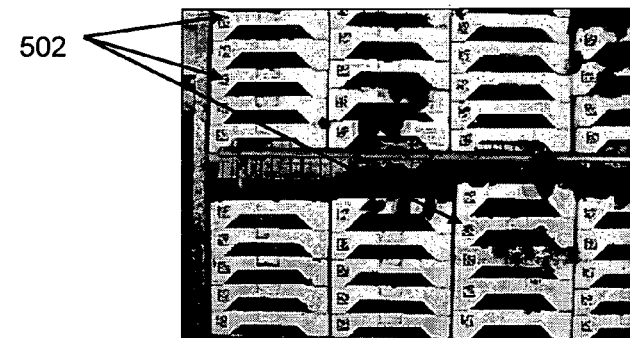
FIG. 5a illustrates an example of a collection of barcodes associated with assets, in accordance with an embodiment of the invention.
Figure 5B:
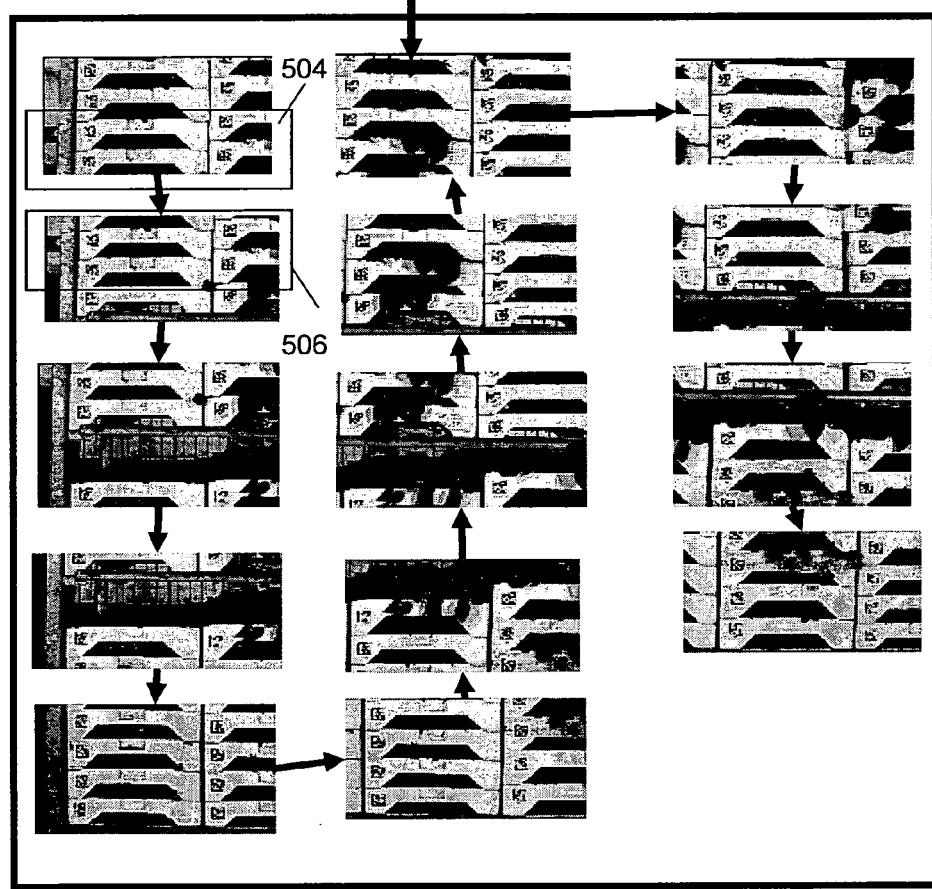
FIG. 5b is an example of multiple images which are generated during the scanning of the barcodes shown in FIG. 5a, according to an embodiment of the invention.

Often, however, the same barcode is used to identify different assets. For example, consider a platform of identical assets where all assets are identified by the same barcode, and where a user is interested in storing all the barcodes associated with the assets on the platform together as a single batch. In such a case, a simple comparison between barcodes is not sufficient, as identical barcodes associated with different assets would be erroneously discarded. FIG. 5a illustrates an example of a collection of barcodes associated with assets, in accordance with an embodiment of the invention. In the illustrated example, three of the assets are associated with an identical barcode (indicated by three arrows 502). FIG. 5b is an example of multiple images which are generated during the scanning of the barcodes shown in FIG. 5a, according to an embodiment of the invention. As indicated by the arrows in FIG. 5b the barcodes shown in FIG. 5a are scanned in one continuous motion (i.e. a single scanning operation) starting from the top left corner, going down to the bottom turning up again and down once more. As shown in FIG. 5b different images contain overlapping sections of the scanned area which include the same barcodes. See for example the overlapping sections 504 and 506 between the first and second image on the top left of FIG. 5b, marked by black rectangles. According to certain embodiments of the invention, barcodes which appear repeatedly in such overlapping sections are removed and only a single instance of each barcode is maintained. On the other hand, identical barcodes which identify different assets (such as those which are indicated by the arrows in FIG. 5a) represent non-repeating barcodes and should not be discarded.

Figure 6:
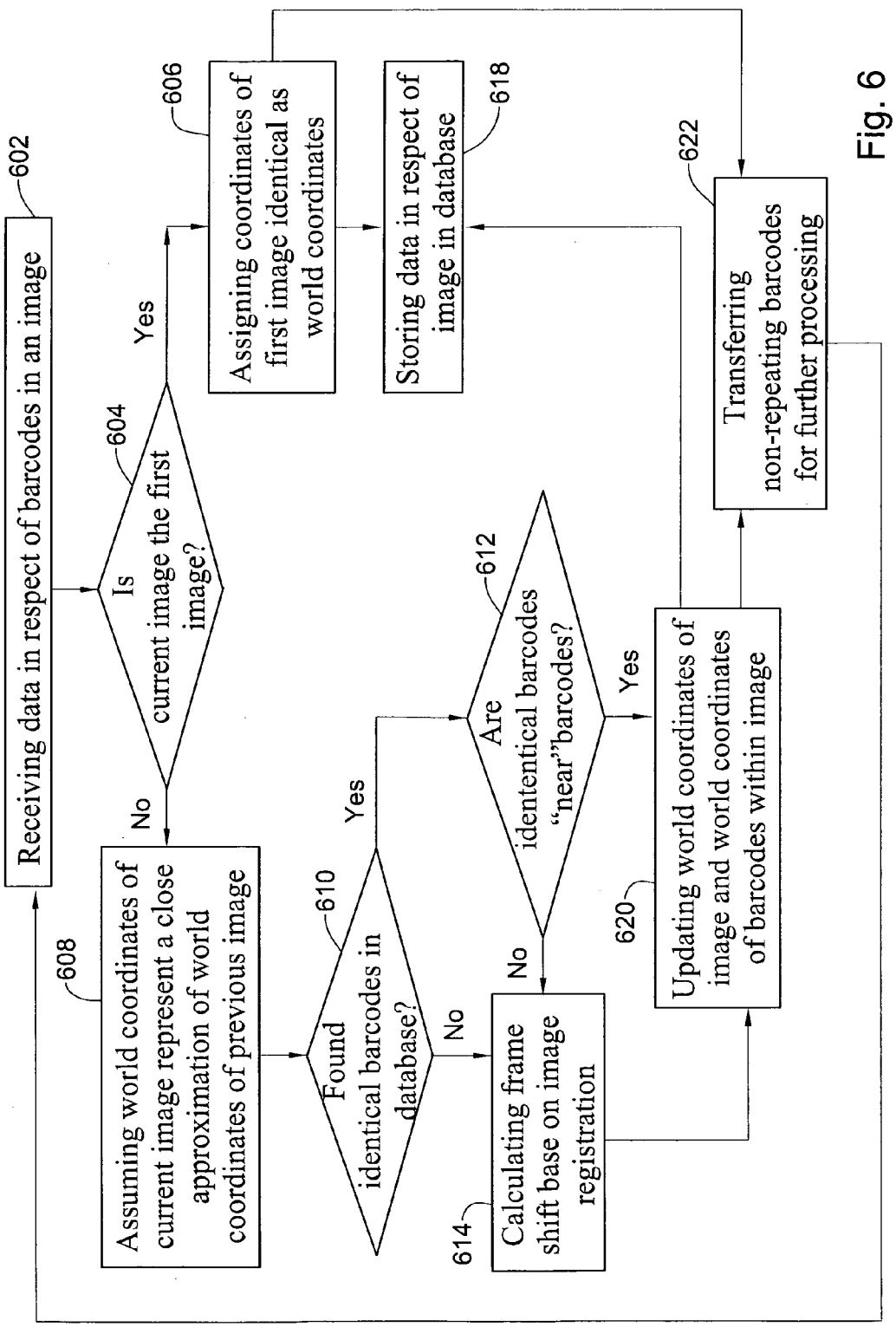
FIG. 6 is flowchart illustrating the operations which are performed by check barcode module 308, in accordance with an embodiment of the invention.

FIG. 6 is a flowchart illustrating the operations which are performed by check barcode module 308, in accordance with an embodiment of the invention. This embodiment should not be construed as limiting the invention in any way, as a number of alternative embodiments may also exist. As previously described, according to certain embodiments, during a single scanning operation, each image which is generated by the capturing module 204 is transferred to the detection module 206 which detects and decodes the barcodes in the image and transfers the data in respect of the detected barcodes to the check barcode module 308. According to certain embodiments, this data includes, in addition to the encoded information in each barcode, the position of each barcode in its corresponding image (for example, the coordinates of the barcode relative to the image), and the coordinates of the image in respect to the entire scanned area (i.e. "the world").

According to certain embodiments, in stage 602 for each image, the data in respect of the image and all barcodes in the image is received by the check barcode module 308. In next stage 604 it is determined whether the current image (i.e. the image which is currently being processed by the check barcode module 308) is the first image generated in the scanning operation. In case it is the first frame, stage 606 is followed. According to certain embodiments, in stage 606 the coordinates of the first image are assigned as the world coordinates. For example, the coordinates of the top left corner of the current image are assumed to overlap with the coordinates of the top left corner of the world coordinates. In the context of present invention the term "world coordinates" refers to the coordinates in respect of the entire area which is scanned in one scanning operation. These coordinates are often different from the local coordinates which are relative to the boundaries of each single image. It should be noted, however, that in some embodiments the world coordinates and coordinates of one or more images may overlap.

According to certain embodiments, in stage 618 the data in respect of the first image is stored in the barcode auxiliary database 340. According to certain embodiments, stage 606 is also followed by stage 622, wherein the non-repeating barcodes (i.e. all barcodes in case of the first image) are transferred for further processing in the system, for example to the padding key modules 410 or 310. Following stage 622 the system returns to stage 602 for further processing of the remaining images.

Returning to stage 604, according to certain embodiments, wherein the current image is not the first image, stage 608 follows. In stage 608 world coordinates of the current image are assumed to represent a close approximation of the world coordinates of the previous image and the coordinates of the current image are updated accordingly. In addition all coordinates of the barcodes in the current image are updated according to the newly updated world coordinates of the current image. According to certain embodiments, in next stage 610 each barcode in the current image is compared to the barcodes from previous images, which are stored in the auxiliary database 340 and it is determined whether the auxiliary database 340 contains identical barcodes. If identical barcodes are found in the auxiliary database 340 stage 612 follows otherwise the process proceeds to stage 614.

According to certain embodiments, in stage 612 it is determined whether a barcode in the current image and its identical counterpart which was found in stage 610, in the auxiliary database 340, are "near" barcodes. According to certain embodiments, the term "near" in the context of the present invention represents estimation as to whether two identical barcodes from different images are in fact repeating instances of the same barcodes. Two identical barcodes from different images which are determined as near barcodes are estimated as being associated with the same asset, while two identical barcodes from different images which are determined as not near, are estimates as being associated with different assets.

According to certain embodiments, the answer to the question whether two identical barcodes are near or not, is determined, inter alia, based on a comparison of the calculated distance between the world coordinates of two identical barcodes from different images, and a predefined maximal distance. The maximal distance defines the largest allowed distance between the world coordinates of two identical barcodes, which are repeated in different images while being associated with the same asset (i.e. barcodes which are the same). The maximal distance is determined by a statistical estimation based on a plurality of parameters which are combined together, where, in different embodiments, different combinations of parameters may be used. An example of such parameters is the number of images per second captured by the imager and the maximal movement speed of the imager (e.g. speed of hand movement) which allows the imager to maintain its operability.

Consider for example an image sensor with 60 milliseconds per frame (which is around 17 images per second) and a maximal movement speed of 1 meter per second. According to one embodiment, the maximal distance between two consecutive images which are captured by an image sensor can be estimated by multiplying the hand speed by the average interval between images. Thus, based on the given hand speed and given image rate per second in the above example, the maximal distance can be estimated as $1/17$ times 1 which equals $1/17$ meters. This distance can be used for estimating whether two identical barcodes in different images represent in fact the same barcodes. The difference between the world coordinates of identical barcodes is calculated and compared to the maximal distance. For example, two identical barcodes which are located in a distance which is greater than $1/17$ meters are likely to represent different barcodes. The greater the distance between two identical barcodes than the calculated maximal distance, the greater the probability that the two barcodes are not the same barcodes.

According to certain embodiments, the decision whether two identical barcodes are the same or not is not made solely on the basis of the above calculation. In order to obtain a more accurate estimation, other parameters are also taken into consideration, for example: the overall number or repeating barcodes in a scanning operation, the number of neighboring repeating barcodes, the average distance between barcodes, the size of the barcodes relative to the field of view of the image sensor. According to some embodiments, neighboring barcodes from the same image are analyzed together in order to provide stronger support for the above calculation and conclusion. For example, as shown in FIG. 5b section 504 and section 506 comprise 4 overlapping barcodes in the two images. Neighboring barcodes which are all characterized by the same calculated shift in their world coordinates establish a better basis for concluding that these barcodes are in fact repeating barcodes. Also for example, the integration of the hand speed can be calculated for providing a more accurate calculation of the hand speed.

According to certain embodiments, if more than one barcode in the auxiliary database 340 is found to be both identical and near to a barcode in the current image, the barcode with the world coordinates values which are the nearest to the world coordinates of the barcode in the current image is retrieved and utilized in the process.

If the answer in stage 612 is affirmative, it is followed by stage 620 in which the world coordinates of the current image and the world coordinates of the corresponding barcodes in the current image are updated based on the calculated difference between the coordinates of the identical barcodes in the current image and in the auxiliary database 340 (i.e. barcodes from previous images). According to certain embodiments, the updated world coordinates of the current image and barcodes are stored in the auxiliary data base 340. According to certain embodiments, in stage 622 the new barcodes in the current image are transferred for further processing in the computer terminal 120, as described above with reference to FIG. 3 and FIG. 4.

According to some embodiments, where no identical barcodes are found in the auxiliary database 340 or wherein identical barcodes which are found in the auxiliary database are determined as not "near", the process continues from stages 610 or 612, respectively, to stage 614. In stage 614 other methods, such as image registration, are utilized in order to calculate the shift between the current frame and the previous frames and to map the current image in the scanned area. For example, pattern recognition algorithms may be utilized. These methods are well known in the art and therefore will not be discussed here any further. Stage 614 is followed by stage 620 in which the world coordinates of the current image and the world coordinates of the corresponding barcodes in the current image are updated based on the shift that was calculated in stage 614. Stage 620 is followed by stage 622 which is described above.

The following is a non-limiting example of the operations which are performed in stages 608 to 620. Assume that the world coordinates of the previous image are (1000, 2000). In stage 608 world coordinates of the current image are assumed to equal (1000, 2000) as well. The coordinates of all barcodes in the current image are corrected according to the new world coordinates of the current image. Thus, a barcode with a local coordinate (i.e. coordinates which are relative to the corresponding image and not the world) of (0,300) is updated according to the new world coordinate to: (1000, 2300).

Now assume that an identical barcode has been found in stage 610, in the auxiliary database 340, with world coordinates (1000, 2500). In stage 612 the distance between the two identical barcodes is determined, amounting to 0 in the x coordinate and 200 in the y coordinate. In this example the distance between the world-coordinates of the two identical barcodes is determined as lower than the maximal distance and the identical barcodes are determined as near barcodes. Thus, the calculated shift between the identical barcodes is assumed to represent the shift in the world coordinates of the current image from previous one. Note in this example the repeating barcodes are used in order to map the images in the space of the scanned area. Thus, according to certain embodiments, the barcodes provide a simpler alternative to methods which were mentioned above with regard to stage 614 and which are normally used. In the following stage 620, the world coordinates of the current image are updated to (1000, 2200) and all the barcodes in the current frame are updated according to the new world coordinates of the image.

Turning to FIG. 7, this shows a flowchart illustrating the general operations carried out in accordance with an embodiment of the invention. In stage 702 the scanning operation is started. As described above the scanning operation begins in response to an activation signal received from the activation device 125. According to one embodiment, the activation signal is generated by the activation device in response to a user action such as pressing on a button or a trigger. According to one embodiment, during the initialization process the imager is positioned in front of a surface on which one or more barcodes are displayed, and is activated by the user. In next stage 704 the imager scans an area which is located in front of the imager according to the size of the field of view of the imager. According to certain embodiments, in next stage 706 the scanned area is captured, by the imaging device 125, and one or more images of the scanned area are generated. The generated images display one or more barcodes which reside within the scanned area. As described above with reference to FIG. 5 the user may move the imager over an area which is larger than a single field of view of the imaging device, continuously scan the area and generate images of the barcodes within the scanned area. This allows a user to define the size of the area, and accordingly the number of barcodes, which are scanned in any given scanning operation. According to certain embodiments, the operations in stage 706 are performed by capturing module 204. In stage 708 each captured image is processed and the barcodes within the captured image are detected and decoded. According to certain embodiments, the operations in stage 708 are performed by detection module 206. According to certain embodiments in the following stage 710 the barcodes in each captured image are compared to barcodes which where detected in previous images in the same scanning operation. During this stage repeating instances of the same barcodes in different images, generated in the same scanning operations, are identified, where such images are ignored while non-repeating barcodes are stored for future reference. According to certain embodiments the operations of stage 710 are performed by check barcode module 308. A more extensive description of the operation of the check barcode module 308 is described above with reference to FIG. 6. According to certain embodiments, stages 706 to 710 are repeated throughout the scanning operation, wherein the operations corresponding to these stages are performed for each image which is generated during the scanning operation. In stage 712 the scanning operation is terminated in response to a termination signal. According to one embodiment, a termination signal is generated by the activation device 125 in response to a user action such as pressing on a button or releasing a pressed trigger. Once the scanning operation is terminated stage 714 follows in which a batch of barcodes is generated containing the non-repeating barcodes which were detected in stage 710. According to certain embodiments, in next stage 716 the batch of barcodes can be further processed or utilized, for example, the batch of barcodes can be stored in a data storage unit 140 or displayed on a displaying device for review.

In addition to the barcode itself, in some cases, the area surrounding the barcode may contain additional data. For example, the area near the barcode may contain a signature of the person who checked the assets before the delivery, or a signature of the person who received the assets and signed next to the barcode in order to confirm that the delivery was made. The area near the barcode may also contain additional data such as different types of signs, marks or insignias indicating, for instance, a brand name or a country. It may be therefore beneficial to obtain and save the additional data located near the barcode together with the barcode.

To this end, according to certain embodiments of the invention, in addition to obtaining and detecting barcodes within a scanned area, imager module 220 is further configured to identify additional data, which is located near the barcode and is scanned together with the barcode in the same scanning operation. As explained above with reference to FIGS. 3 and 4, in response to a scanning operations images are generated which contained one or more barcodes. In addition to detecting the scanned barcodes within these images (e.g. by barcode detection module 206 as explained above), imager module 220 may be configured to identify additional data (e.g. signature or insignia) which exists within the images as well. Once a scanning operation is completed and the barcodes are detected and processed each barcode is associated with the corresponding additional data of that barcode. The association between a given barcode and its relevant additional data can be made based on predefined parameters, such as the distance between the barcode and the additional data and the location of the additional data in respect of a barcode. Additional data may be represented and saved, for example, in some type of an image format (e.g. as a compressed file) in conjunction with the relevant barcode.

According to certain embodiments, where multiple barcodes are scanned in a single scanning operation together with their corresponding additional data, and a plurality of barcodes are associated with identical additional data, a single instance (e.g. image file) of the addition information may be stored and associated with all the relevant barcodes.

Typically each imager 110 is configured with a predefined field of view (i.e. FOV) which defines a range of a maximal and minimal area that can be scanned by the imager in a single image (i.e. without moving the imager). Each FOV is divided into a predefined number of pixels which is determined by the characteristics of the imaging device 112. In order for an imager to be able to scan barcodes of a given size the relation between the FOV and the size of the barcode must be maintained within a predefined maximal threshold. Otherwise, where the relation between the FOV and the barcode exceeds that threshold, the imaging device 112 is out of focus and the captured images are likely to become blurred. Thus, typically the FOV of an imager is set such that it would enable reading the smallest available barcode, where larger barcodes can also be read as they have an even more optimal relation between the FOV and the size of the barcode. However, one possible disadvantage when using a single FOV for reading barcodes of different sizes is that larger barcodes occupy a larger space of the FOV.

When reading one barcode at a time the aforementioned disadvantage is not apparent, since usually even large barcodes are smaller than the typical FOV. However, when attempting to read a batch of barcodes together, the above shortcoming becomes more critical, as it is not possible to conveniently read multiple barcodes (of large size) without continuously moving the reader over the surface. Also where, as a result of the FOV, each barcode is captured in a separate image, it becomes complicated and sometimes even impossible to utilize image registration methods, which are mentioned above with reference to FIG. 6. Moreover, this problem cannot be rectified by simply moving the imager away from the scanned area since the distance between the imager and the scanned surface must stay within a predefined range in order to maintain the focus of the imaging device.

Figure 8A:
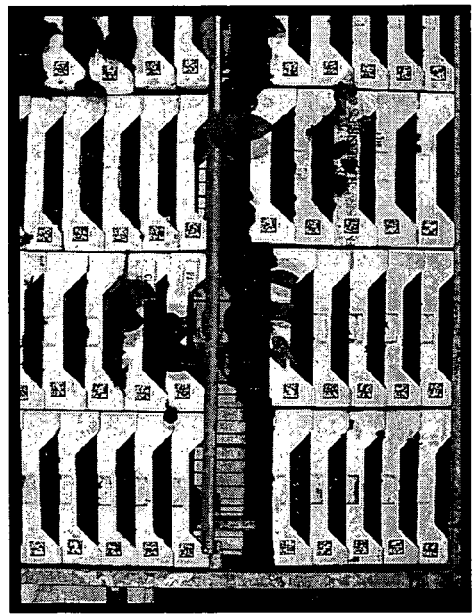
FIGS. 8a, 8b and 8c demonstrate the relation between the size of the barcodes and the size of the field of view, according to an embodiment of the invention.
Figure 8B:
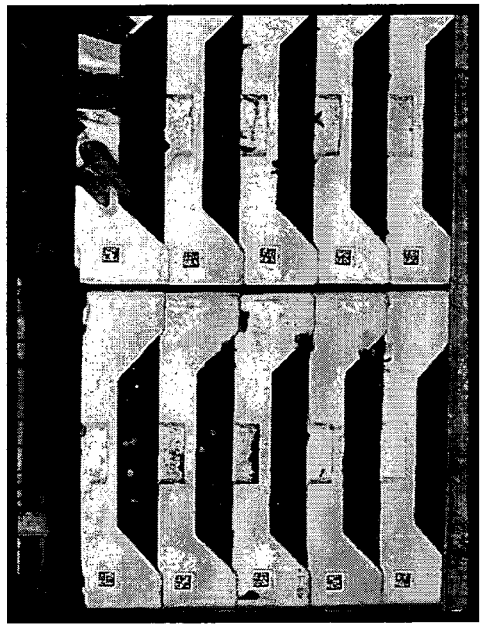
Figure 8C:
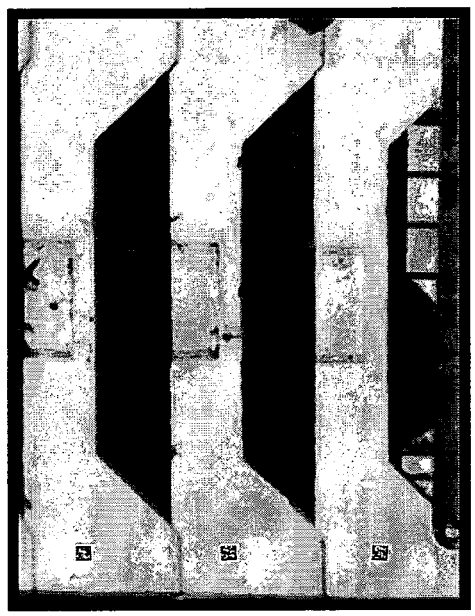

FIGS. 8*a*, 8*b* and 8*c* demonstrate the relation between the size of the barcodes and the size of the FOV, according to an embodiment of the invention. FIG. 8*a* shows barcodes of large size which are read by an imager having a FOV covering a large area, thereby allowing reading many barcodes in a single frame. FIG. 8*b* shows barcodes of medium size, which are read by an imager having a FOV covering a medium area and FIG. 8*c* shows barcodes of small size which are read by an imager having a FOV covering a small area. As can be seen from the comparison of FIGS. 8*a*, 8*b* and 8*c* a large barcode size allows utilizing a large FOV thereby enabling simultaneously scanning a large number of barcodes. Thus, when reading batches of barcodes, it is advantageous to use an imager which is capable of utilizing a number of different interchangeable fields of view.

Figure 9:
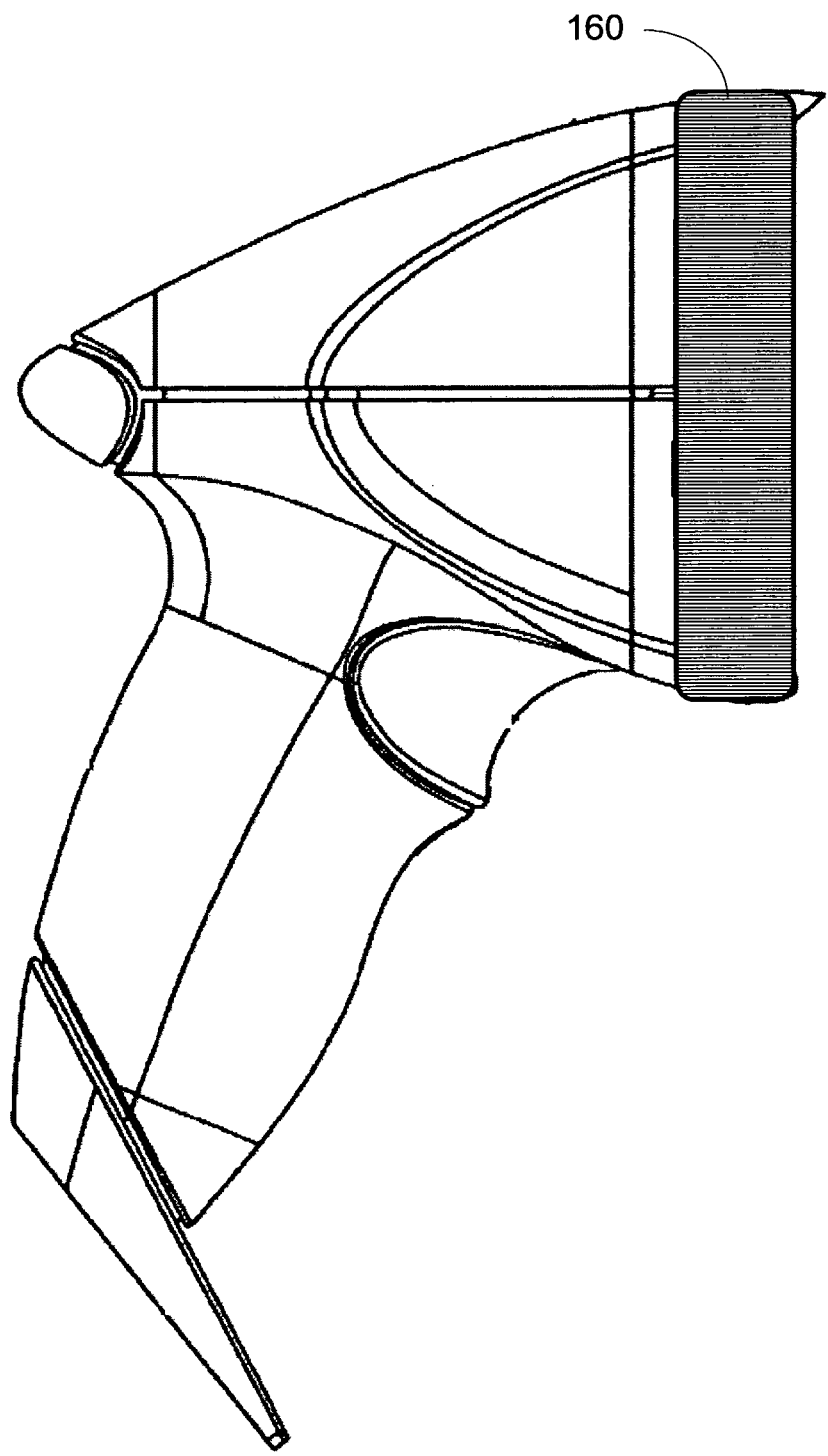
FIG. 9 illustrates a barcode reader with a field of view selector, according to an embodiment of the invention.

According to certain embodiments of the present invention there is provided a barcode detection system which is configured for reading large barcodes more conveniently, especially when reading batches of barcodes. FIG. 9 illustrates a barcode imager featuring a FOV selector 160 configured for selecting between different fields of views, in accordance with an embodiment of the invention. According to one embodiment, the imager 110 is featured with a FOV selector which enables to adapt the FOV of the imager in accordance with the size of the barcodes. When reading barcodes of small size a FOV of suitable size is selected in order to obtain the appropriate relation between the FOV (and the corresponding size of pixels) and the size of the barcodes. When reading larger barcodes the FOV selector 160 can be used in order to change the size of the FOV while maintaining the required relation between the FOV size and the size of the barcodes. According to one embodiment the FOV selector is adjusted by turning.

According to one embodiment, the FOV selector 160 is configured for adapting the focus of the sensor to the selected FOV, enabling the user to change the distance of the imager from the surface. Thus, when reading large barcodes, the user can move the imager away from the scanned area and use the FOV selector 160 for selecting an appropriate FOV. The FOV selector 160 thus enables to capture a large number of barcodes in each image. According to another embodiment, the selector 160 is configured for adapting the zoom of the imager. Thus, the user can use the selector in order to change the zoom of the imager in order to change the FOV. Alternatively, the FOV selector 160 may be adapted to change the zoom of the imager by replacing the lens of the imager with one or more alternative lenses having a different focal distance. According to one embodiment, the focus of the sensor is automatically adapted to the new zoom. According to another embodiment, the focus is manually adapted to the new FOV by the user.

Alternatively or additionally, the barcode detection system of the present invention may also utilize an imaging device 112 with higher resolution. Typically using an imaging device having a resolution of about 1 mega pixel is sufficient for reading individual barcodes. However, when reading batches of barcodes, it is beneficial to use an image sensor with higher resolution since it enables to utilize a larger FOV.

When attempting to read batches of barcodes together in a single reading operation it is advantageous to be able to monitor the progress of the scanning operation. To this end, according to certain embodiments, the detection system of the present invention comprises a display, such as for example LCD. According to one embodiment, display may be configured directly on the imager, thereby allowing the user to easily monitor the scanning operation in real-time. According to another embodiment, the display may be associated with the computer terminal 120. According to yet another embodiment, the display may be a configured as a separate unit in additional to the imager 110 and computer terminal 120.

The display may be configured for providing different types of information corresponding to the scanned barcodes. In one embodiment, the display may be utilized for displaying the number of scanned barcodes allowing the user to confirm that all barcodes have been scanned. Alternatively or additionally, the display may show the images which are captured by the imager. For example, as shown in FIGS. 5*a* and 5*b* often in a single scanning operation a plurality of images are generated. According to one embodiment, the display may show the last image that was generated, optionally marking the non-repeating barcodes which are identified within the image. According to another embodiment, the display may show an image of the entire scanned area wherein the image can be continuously built and updated in accordance with the progress of the scanning operation such that each new area that is being scanned is added to the displayed image. A full image of the entire scanned area is displayed at the end of the scanning operation.

While various embodiments have been shown and described, it will be understood that there is no intent to limit the invention by such disclosure, but rather, it is intended to cover all modifications and alternate constructions falling within the scope of the invention, as defined in the appended claims.

The invention claimed is:

1. A barcode detection system for simultaneously detecting a group of barcodes, comprising:
   a handheld barcode reader comprising an imaging device and a processing unit;
   said barcode reader being responsive to an activation device; said activation device is configured to generate an activation signal in response to a first action of a user; said barcode reader is configured to commence a scanning operation in response to said activation signal; said imaging device is configured to scan a plurality of barcodes during said scanning operation;
   said processing unit is configured to perform at least the following:
   generate one or more images representing said plurality of bar codes;
   detect and decode said plurality of barcodes within said one or more images thereby obtaining data in respect of each barcode from said plurality of barcodes;

generate a group of two or more data each data in said group corresponding to a different barcode in the scanned area;

for each given image of plurality of images being generated:

compare between data in respect of each barcode in said given image and data in said group of two or more data, based on said data in respect of each of said plurality of barcodes and add to the said group any data which is not found in the group of two or more data thereby maintain in said group a single data copy for each barcode in the scanned area;

said activation device is configured to generate a termination signal in response to a second action of said user, and wherein in response to said termination signal said barcode reader is configured to terminate said scanning operation and store said group of two or more data in association with a single batch of barcodes scanned during said scanning operation.

2. The barcode detection system of claim 1 wherein said data comprises decoded information of a barcode, and a location of a barcode in respect of said scanned area.

3. The barcode detection system of claim 2 further configured to calculate said location of a barcode in respect of said scanned area based on a location of said barcode in respect of its corresponding image and a location of said image in respect of said scanned area;

wherein said location of said image in respect of said scanning area is calculated based on the location, of barcodes in other images in respect of said scanned area, which are identical to barcodes in said image.

4. The barcode detection system of claim 1, wherein said barcode detection system is associated with a data storage unit, and wherein said processing unit is configured to store said group of data in said data storage unit as a single record.

5. The barcode detection system of claim 1, wherein said barcode reader further comprises a field of view selector, said selector is configured to enable to set a preferred field of view out of a plurality of available fields of view.

6. The barcode detection system of claim 1, wherein said barcode reader further comprises a display for displaying information in respect of said one or more images said information being indicative of one or more of:
decoded barcodes; and scanned area.

7. The barcode detection system of claim 1 wherein said processing unit is further configured to identify additional data in an area surrounding said plurality of barcodes within said one or more images, associate said additional data with a corresponding one or more barcodes from said plurality of barcodes and store said additional data in association with its corresponding one or more barcode.

8. The barcode detection system of claim 1, wherein the processing unit is further configured to perform the following in order to eliminate multiple decoded data originating from the same barcode within a scanned area:

i) identify a first barcode from one image of said one or more images and a second barcode from a second image of said one or more images, said first barcode and second barcode having identical decoded information;

ii) calculate an estimated location of said second barcode in respect of a scanned area in said scanning operation, based on an estimate location, in respect of said scanned area, of a previous image;

iii) compare between a location of said first barcode in respect to said scanned area and a location of said second barcode in respect of said scanned area and calculating a distance between said first and said second barcode;

iv) determine whether said distance is greater than a predetermined maximal distance and if so, designating said first barcode and said second barcode as different barcodes and save data in respect of both said first and said second barcodes;

otherwise designate said first and said second barcodes as the same barcodes and discard one of said first and said second barcodes, save data in respect of one of said first and said second barcodes and update said location of said second image based on the location of said first and second barcodes; and repeat stages (i) to (iv) for each barcode from said plurality of barcodes.

9. A barcode detection method for simultaneously detecting a group of barcodes, comprising:

(a) initiating a scanning operation in response to an activation signal generated by an activation device in response to a first action of a user;

(b) scanning a plurality of barcodes, by an imaging device, during said scanning operation;

(c) generating one or more images representing said plurality of barcodes;

(d) detecting and decoding said plurality of barcodes within said one or more images thereby obtaining data in respect of each barcode from said plurality of barcodes;

(e) generating a group of two or more data each data in said group corresponding to a different barcode in the scanned area;

(f) for each given image of plurality of images being generated:

i) comparing between data in respect of each barcode in said given image and said group of two or more data based on said data in respect of each of said plurality of barcodes; and (ii) adding to the said group any data which is not found in the group of two or more data thereby maintaining in said group a single data copy for each barcode in the scanned area;

(g) terminating said scanning operations in response to a termination signal generated by said activation device in response to a second action of a user; and, (h) storing said group of two or more data in association with a single batch of barcodes scanned during said scanning operation.

10. The method according to claim 9, wherein said data comprises decoded information of a barcode, a location of a barcode in respect of a scanned area; the method further comprising calculating said location of a barcode in respect of said scanned area based on a location of said barcode in respect of its corresponding image and a location of said image in respect of said scanned area;

said location of said image in respect of said scanning area is calculated based on the location of barcodes in other images in respect of said scanned area, which are identical to barcodes in said image.

11. The method according to claim 9 further comprising storing said group of data as a single record in a data storage unit.

12. The method according to claim 9 further comprising selecting a preferred field of view out of a plurality of available fields of view with the help of a field of view selector.

13. The method according to claim 9 further comprising displaying information in respect of said one or more images with the help of a display; said information being indicative of one or more of: decoded barcodes; and scanned area.

14. The method according to claim 9 further comprising: with the help of a processing unit: identifying additional data in an area surrounding said plurality of barcodes within said one or more images, associating said additional data with a corresponding one or more barcodes from said plurality of barcodes and storing said additional data in association with its corresponding one or more barcode.

15. The method according to claim 9, wherein said eliminating multiple decoded data originating from the same barcode within a scanned area, comprising:
   i) identifying a first barcode from one image of said one or more images and a second barcode from a second image of said one or more images, said first barcode and second barcode having identical decoded information;
   ii) calculating an estimated location of said second barcode in respect of a scanned area in said scanning operation, based on an estimate location, in respect of said scanned area, of a previous image;
   iii) comparing between a location of said first barcode in respect to said scanned area and a location of said second barcode in respect of said scanned area and calculating a distance between said first and said second barcode;
   iv) determining whether said distance is greater than a predetermined maximal distance and if so, designating said first barcode and said second barcode as different barcodes and saving data in respect of both said first and said second barcodes;
   v) otherwise designating said first and said second barcodes as the same barcodes and discarding one of said first and said second barcodes, saving data in respect of one of said first and said second barcodes and updating said location of said second image based on the location of said first and second barcodes; and
   vi) repeating stages (i) to (iv) for each barcode from said plurality of barcodes.

* * * * *